United States Patent [19]

Desjardins

[11] Patent Number: 4,701,788
[45] Date of Patent: Oct. 20, 1987

[54] COLOR TEMPERATURE CORRECTION OF COLOR VIDEO PROJECTORS

[75] Inventor: Francois G. Desjardins, Maryhill, Canada

[73] Assignee: Electrohome Limited, Ontario, Canada

[21] Appl. No.: 823,677

[22] Filed: Jan. 29, 1986

[51] Int. Cl.[4] .......................... H04N 9/31; H04N 9/73
[52] U.S. Cl. .......................... 358/64; 358/29; 358/60; 358/74
[58] Field of Search .................. 358/60, 61, 62, 63, 358/64, 74, 27, 29

[56] References Cited

U.S. PATENT DOCUMENTS 4,300,156 11/1981 Boyd .................................. 358/60
4,607,280 8/1986 Kurg ................................... 358/60

FOREIGN PATENT DOCUMENTS 53-115137 7/1978 Japan ................................... 358/60
57-13879 1/1982 Japan .................................... 358/60

Primary Examiner—James J. Groody
Assistant Examiner—Robert M. Bauer
Attorney, Agent, or Firm—Merchant, Gould, Smith, Edell, Welter & Schmidt

[57] ABSTRACT

A color video projector of the type employing red, green and blue cathode ray tubes, dichroic mirrors and a final single lens through which the red, green and blue light from the CRTs is projected on a screen exhibits non-uniform color temperature across the width of the screen. Compensating waveforms for the red, green and blue video signals are generated and multiplied with the respective red, green and blue contrast signals, the products then being multiplied with the red, green and blue video signals respectively and applied to the cathodes (or grids) of the red, green and blue CRTs respectively to provide a more uniform color temperature across the width of the screen.

3 Claims, 18 Drawing Figures

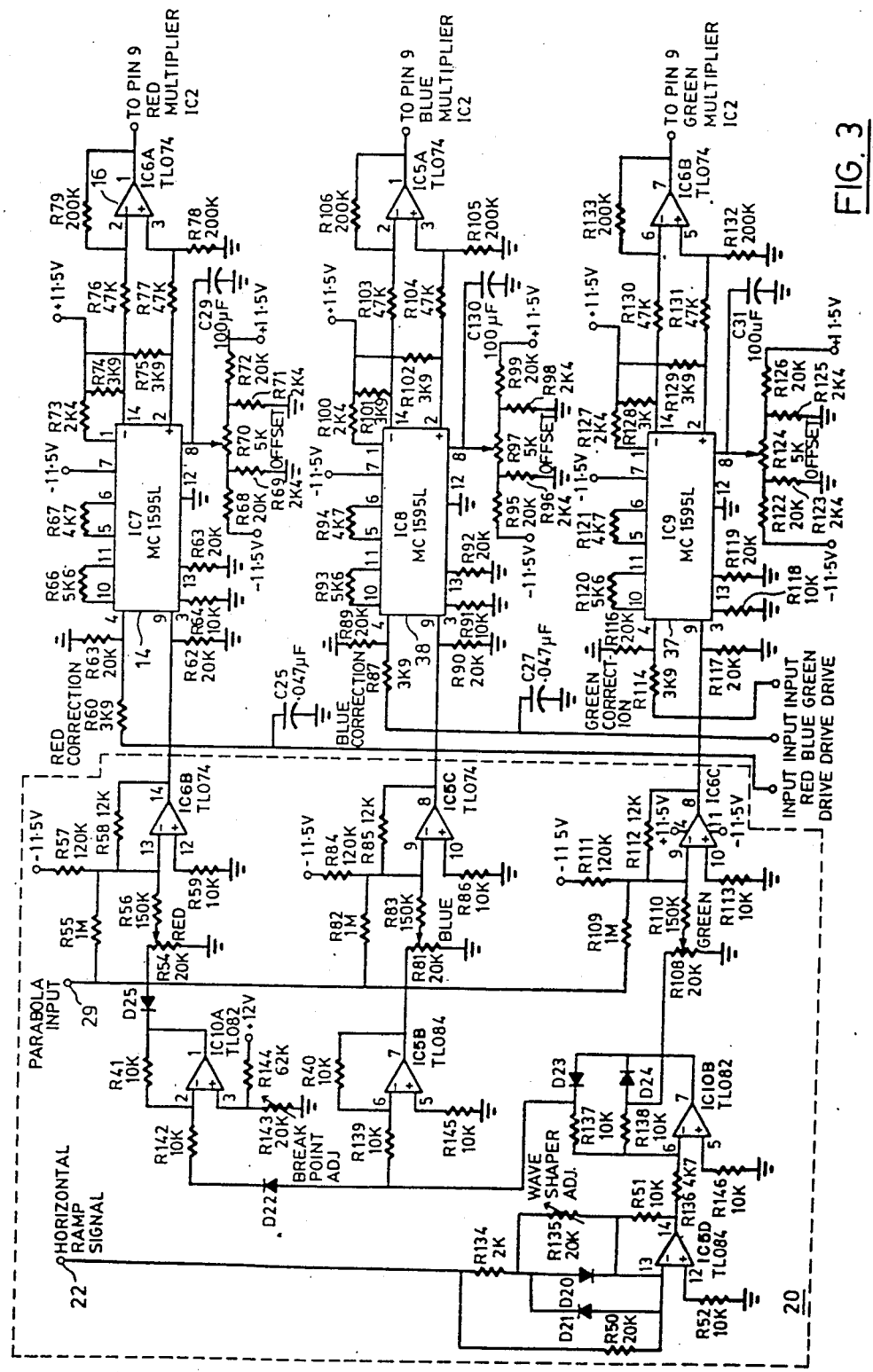

COLOR TEMPERATURE CORRECTION OF COLOR VIDEO PROJECTORS

BACKGROUND OF THE INVENTION

This invention relates to colour video projectors of a type employing red, green and blue cathode ray tubes (CRTs), dichroic mirrors and a final single lens through which the red, green and blue light from the CRTs is projected onto a screen. Projectors of this type commonly are used as monitors for computer graphics and video applications. Additional details of such a projector may be found in U.S. Pat. No. 4,607,280 issued Aug. 19, 1986, Maarjus Kurg entitled "Video Projector" and assigned to the assignee of the present application, the disclosure of which is incorporated herein by reference.

Projectors of the type noted above have a substantial advantage over three lens systems, in which the red light, green light and blue light pass separately through three separate final lenses, in that the latter require a tedious and time-consuming operation to be performed to achieve convergence on the screen. The former, on the other hand, have the advantage of portability because each CRT is converged inside the projector at the factory, enabling easy customer set up at any location.

Electrohome Limited of Kitchener, Ontario, Canada, just has begun to sell a colour video projector known as the ECP1000. In the evolution of the design of this projector it was found at one stage to have two disadvantages, the first being non-uniform colour temperature across the width of the screen, and the second being a marked decrease in brightness as high as 75% from the centre to each edge of the screen.

The instant invention is directed in its primary aspect to a solution to the first problem. As a secondary aspect a solution to the latter problem also is provided.

SUMMARY OF THE INVENTION

In combination with a colour video projector for projecting an image on a screen and of a type employing red, green and blue cathode ray tubes for projecting red, green and blue light respectively, dichroic mirrors and a final single lens through which the red, green and blue light is projected on said screen and which is characterized by non-uniform colour temperature across the width of the screen of the image projected thereon, the non-uniform colour temperature specifically being as a result of a substantially linear decrease in green light intensity between about the centerline of said screen and one edge thereof, said centerline being one-half way between said one edge of said screen and the edge thereof opposite to said one edge, a substantially linear decrease in blue light intensity between about said centerline of said screen and said opposite edge of said screen to said one edge thereof and a substantially linear increase in red light intensity between said opposite edge of said screen and a location part way between said opposite edge of said screen and said centerline of said screen, apparatus for improving the uniformity of said colour temperature across the width of said screen, said apparatus comprising: means for deriving red, green and blue contrast signals respectively; non-linear waveform generating means for deriving red, green and blue correction signals respectively, said red correction signal being of a type that will increase said red light intensity between said location and said opposite edge of said screen to compensate at least partially for the inherent decrease in said red light intensity between said location and said opposite edge of said screen, said green correction signal being of a type that will increase said green light intensity between about said centerline of said screen and said one edge of said screen to compensate at least partially for the inherent decrease in green light intensity between about said centerline of said screen and said one edge of said screen, and said blue correction signal being of a type that will increase said blue light intensity between about said centerline of said screen and said opposite edge thereof the compensate at least partially for the inherent decrease in blue light intensity between about said centerline of said screen and said opposite edge of said screen; mulitplying means for multiplying said red contrast and said red correction signals, said green contrast and said green correction signals and said blue contrast and said blue correction signals to provide separate red, green and blue colour correction modulated red, green and blue contrast signals; means for deriving red, green and blue video signals; multiplying means for multiplying said red video signal and said red colour correction modulated red contrast signal, said green video signal and said green colour correction modulated green contrast signal and said blue video signal and said blue colour correction modulated blue contrast signal; and means for supplying the signals from the last-mentioned multiplying means to drive said red, green and blue cathode ray tubes respectively.

BRIEF DESCRIPTION OF THE DRAWINGS

This invention will be better understood from the following detailed description, taken in conjunction with the appended drawings in which:

FIG. 3 is a more detailed drawing of various components of the system illustrated in FIG. 4;

DETAILED DESCRIPTION OF THE INVENTION INCLUDING THE PREFERRED EMBODIMENT

Colour temperature in simple terms can best be explained as what tone of white a projected white field is on a screen if a white video signal is applied. An ideal white is 6500° K., which is optimum for good flesh tones in video applications.

Figure 1:
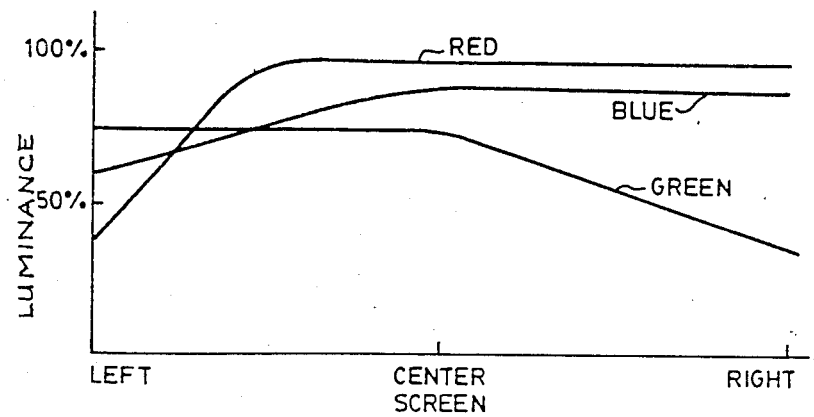
FIG. 1 is a graph showing the change in luminance of the red, green and blue light of a colour video projector of the type to which this invention relates prior to compensating, in accordance with this invention, for the non-linearities exhibited in FIG. 1.

An appreciation of the problem that arose in the creation of the ECP1000 can be had from reference to FIG. 1. Without the colour temperature correction system embodying the present invention, FIG. 1 shows the luminance of red, green and blue light projected by the projector at various locations on a screen. There is a substantially linear decrease in green light intensity between about the centre of the screen and the right edge thereof. On the other hand, there is a substantially linear decrease in blue light intensity between about the centre of the screen and the left edge thereof, and a substantially linear decrease in red light intensity was observed commencing about one half way between the centre of the screen and the left edge thereof and proceeding to the left edge of the screen. A colour temperature variation across the screen manifested itself as a greenish area on the left side of the screen and a reddish area on the right side of the screen.

In addition to the foregoing, brightness attenuation at the edges of the screen was observed, this being due to the presence of F-stop rings on some of the CRT lenses and light transmittance and reflection inconsistencies of the dichroic mirrors.

In accordance with the present invention, it has been discovered that the foregoing problems can be solved by independently applying to each RGB contrast drive suitable waveforms to vary the drive (generally cathode but could be grid) and therefore beam current of the red, green and blue CRTs at specific sections of the screen to improve colour temperature uniformity and, optionally, centre to edge brightness uniformity.

To achieve the desired objective of colour temperature uniformity, the signal which is applied to the cathode of each CRT must be the product of the input video signal, the contrast signal and the correction signal, and one suitable system for providing such signals now will be discussed. It must be appreciated, however, that it is exemplary only, and those skilled in the art will have no difficulty in conceiving of other systems to implement the instant invention in its broader aspects. Also it should be noted that while the system to be described hereinafter in detail provides signals to drive the cathodes of the CRTs, it would be equally possible, within the framework of the present invention, to provide signals for the grids of the CRTs.

Figure 2:
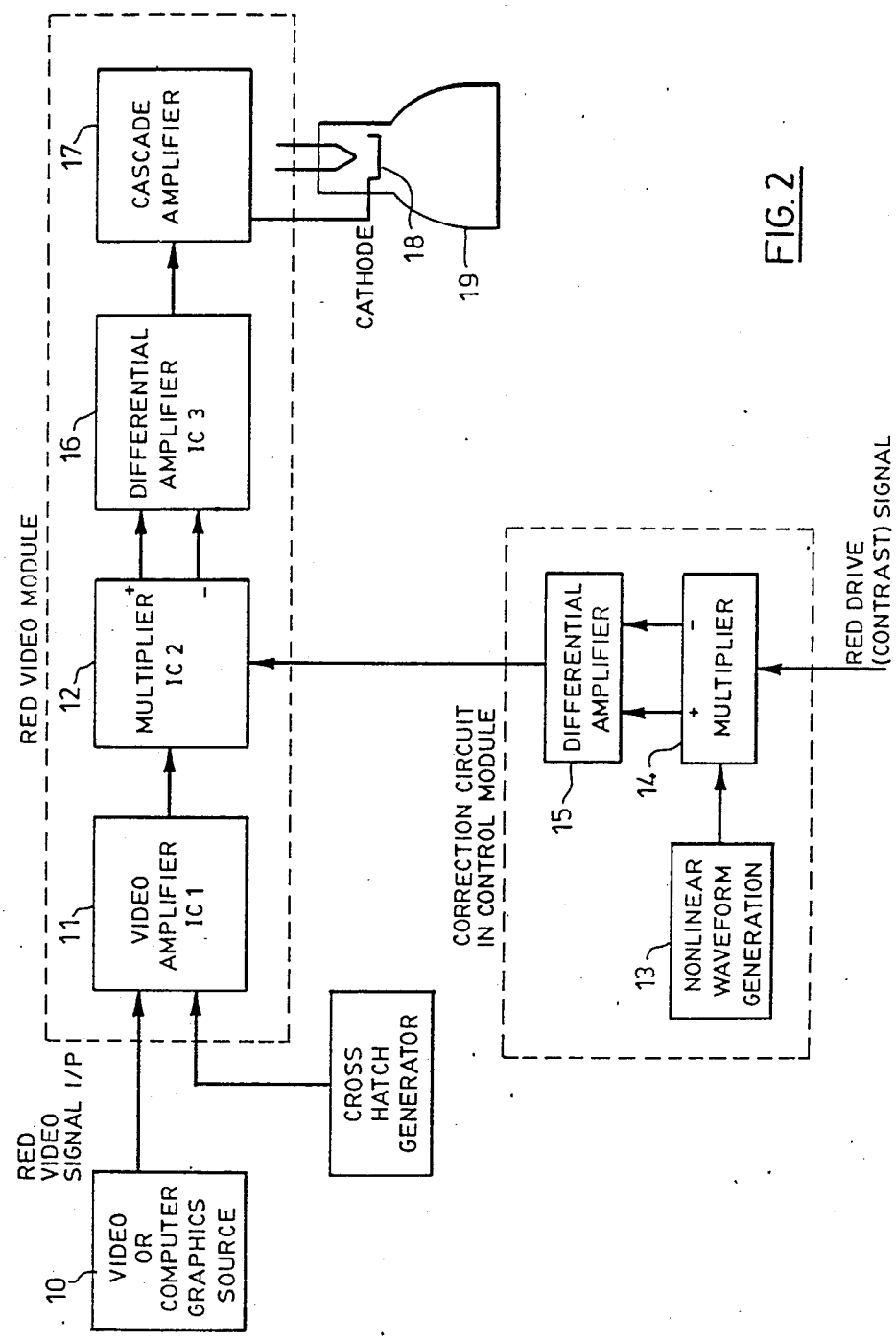
FIG. 2 is a block diagram illustrating one embodiment of the invention and showing correction of the luminance of the red video signal, it being understood that other systems like that shown in FIG. 2 are employed for correction of the luminance of the green and blue video signals.

A block diagram of an embodiment of the invention is shown in FIG. 2. Referring to that Figure, which shows only the red video correction system, the green and blue video correction systems being identical and hence, for the sake of simplicity, being omitted, there is a red video signal source 10 that may be, for example, a video or computer graphics source. Its output is amplified by a video amplifier that supplies its output to one input terminal of a multiplier 12.

A non-linear waveform generator 13 provides a colour correction signal to compensate for the change in red light intensity shown in FIG. 1 and supplies this to one input terminal of a multiplier 14. A red drive (contrast) signal is derived conventionally and supplied to the other input terminal of multiplier 14. The differential output of multiplier 14 is supplied to a differential amplifier 15 whose variable, single-ended output is $V_o = KV_xV_y$, where K is a scale factor, $V_y$ is the contrast voltage and $V_x$ is the red colour correction voltage. The output of differential amplifier 15 is supplied to the other input terminal of multiplier 12, the differential output of which is applied to a differential amplifier 16 providing a single-ended output that is the desired product of the red video signal, red contrast signal and red colour correction signal. It is amplified by a cascade amplifier 17 and supplied to the cathode 18 of red CRT 19. The result is that a signal is supplied to cathode 18 that at least partially compensates for the decrease in the luminance of the red light shown in FIG. 1 and flattens out the left hand part of the red curve.

In a similar fashion the left hand part of the blue curve and the right hand part of the green curve in FIG. 1 each are flattened to provide more uniform colour temperature across the width of the screen.

A colour temperature (and brightness) correction network that may be used in practising this invention is shown in greater detail in FIG. 3, to which reference now will be made.

A wave shaper 20 composed of IC5D and associated components (diodes D20 and D21, resistors R134, R50, R51 and R52 and variable resistor R135) is provided and serves the basic function of making the colour temperature correction signal non-linear in order to compensate for the non-linearity of the cathodes of the CRTs. In this respect, it must be appreciated that luminance is not linearly related to applied cathode voltage. The relationship is parabolic and can be represented by the formula:

$$L = K_A V^2$$

where $K_A$ is a constant, V is the cathode voltage of the CRT and L is the luminance in ft./lamberts. Thus, in order to compensate for the linear changes in red, green and blue luminance shown in FIG. 1, correction signals having parabolic waveforms are required.

Figure 6:
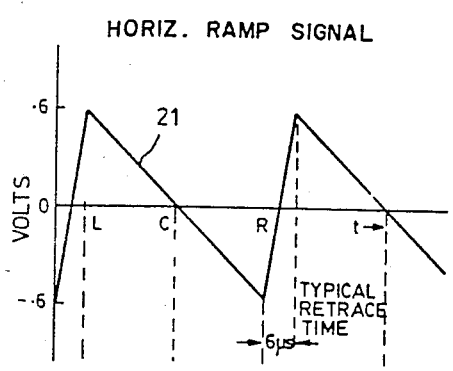
FIGS. 6 through 18 inclusive are graphical depictions of various waveforms useful in understanding the operation of a system embodying the present invention.

A horizontal ramp signal 21 (FIG. 6) that is obtained from the deflection circuitry of the colour video projector is applied to input terminal 22 and hence to wave shaper 20. The wave shaper really is a summing amplifier of two currents, one being the current through resistor R50 and the other being the current through resistor R134. The current through resistor R50 is $I_{R50}$ = ramp voltage 21/R50. The current through R134 is more complex, however, since it is voltage dependent. Thus, when the ramp voltage 21 is below about 0.6 volts (the barrier voltage of diodes D20 and D21), $I_{R134}$ = ramp voltage 21/(R134+R135).

Figure 4:
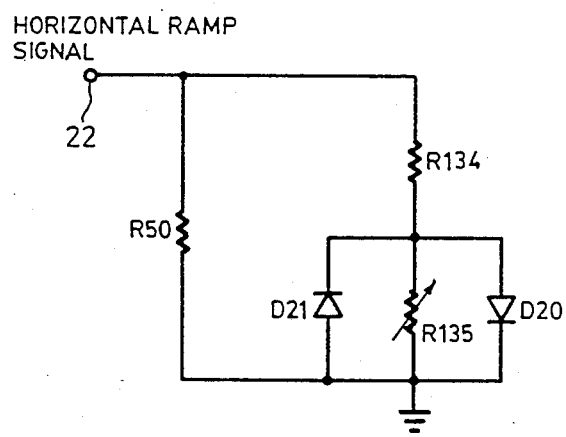
FIG. 4 is a circuit diagram useful in understanding the operation of the wave shaper shown in FIG. 3.

For an analysis of the operation of wave shaper 20 when ramp voltage 21 is above 0.6 volts, the wave shaper circuitry can be made simpler. In this respect, since pin 13 of IC5D is a virtual ground, the current path through wave shaper 20 can be redrawn as shown in FIG. 4. If it is assumed that variable resistor R135 is adjusted to provide maximum resistance, and ramp voltage 21 is 0.6 volts, the voltage across the diodes D20 and D21 will be 0.545 volts, barely enough to overcome the barrier voltage of the diode that is poled to conduct for the applied polarity of the ramp voltage, and the current through resistor R134 still will be given by ramp voltage 21/(R134+R135). Above 0.6 volts, however, the current through resistor R134 becomes (ramp voltage 21−0.6 volts)/R134. By changing the value of variable resistor R135, the magnitude of ramp voltage 21 at which the above change occurs can be varied.

It will be understood, of course, that reversely poled diodes D20 and D21 are provided so that the effect noted above will be obtained on both positive and negative swings of ramp voltage 21.

Figure 8:
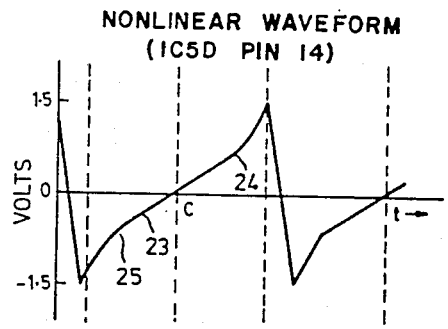

The output voltage of IC5D is $(I_{R134}+I_{R50}) \times R51$ and is shown by waveform 23 in FIG. 8. Waveform 23 has two variable breakpoints 24 and 25 whose location can be varied by adjusting the value of variable resistor R135. Both above and below the breakpoints waveform 23 is essentially linear, but because of the difference in the slopes of waveform 23 above and below breakpoints 24 and 25, the desired parabolic correction waveform is provided.

IC10B and its associated components (diodes D23 and D24 and resistors R136, R137, R138 and R146) constitute a dual precision rectifier 26 that isolates the positive and negative components of the non-linear waveform 23.

Figure 11:
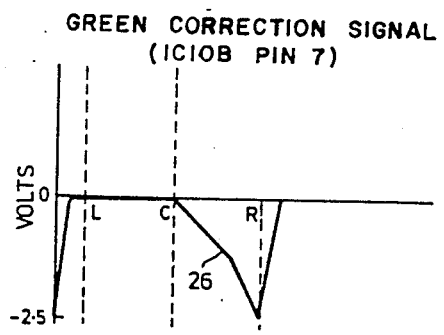

The signal at the cathode of diode D24 is shown at 26 in FIG. 11 and is a negative-going signal coinciding with the right hand side of the screen. Thus, after it has been inverted by summing amplifier IC6C, to which it is supplied, it will be the desired correction signal for green.

Potentiometer R108 can be adjusted so that the amount of green correction signal will be what is required for the particular dichroic mirrors employed in the video projector.

Figure 7:
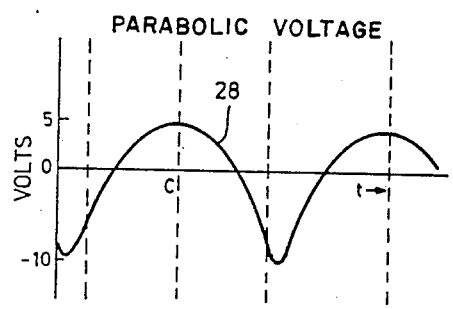

To compensate for low in brightness at the edges of the screen, a parabolic voltage 28 (FIG. 7) in synchronism with the horizontal ramp signal 21 may be applied to terminal 29 and added to the green correction signal via resistor R109. Parabolic voltage 28 increases the cathode drive of the green CRT at the edges of the screen while reducing the drive at the centre of the screen, thus improving centre to edge brightness.

Resistor R111 will vary the percentage of correction at the cathode of the green CRT.

Figure 14:
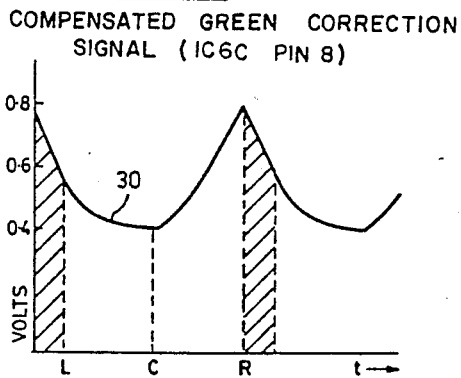

The output voltage of summing amplifier IC6C = $(I_{R111} + I_{R109} + I_{R110}) \times R112$ and is shown by waveform 30 in FIG. 14. The percentage of parabola correction (edge brightness) is $I_{R109}/I_{R111}$. The percentage of green correction on the right side is $I_{R110}/I_{R111}$.

Figure 9:
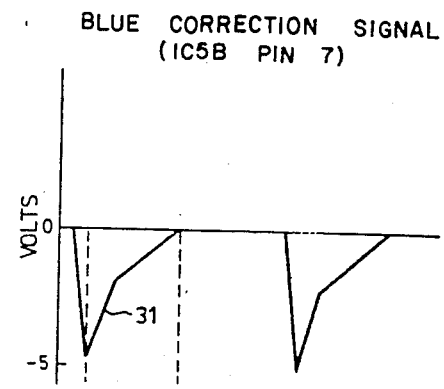
Figure 13:
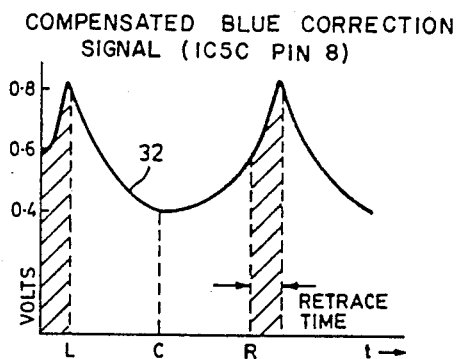

The signal at the cathode of diode D23 is of positive polarity on the left hand side of the screen. The blue light requires a negative signal on the left hand side of the screen for correction, and this is achieved by the inverting action of inverter IC5B. The blue correction signal at pin 7 of IC5B is shown at 31 in FIG. 9 and is supplied to summing amplifier IC5C via a potentiometer R81, which can be adjusted to provide for the required degree of blue correction for the particular dichroic mirrors employed in the video projector. Parabolic waveform 28 also is supplied via a resistor R82 to summing amplifier IC5C to compensate for loss of brightness at the edges of the screen. The output at pin 8 of summing amplifier IC5C is the waveform 32 shown in FIG. 13.

Figure 10:
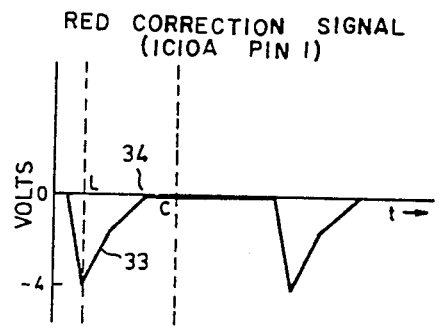

The red light also requires a negative signal, but only in the first quarter of the left hand side of the screen. The signal at the cathode of diode D23 is inverted by inverter IC10A to make it the proper polarity for red correction. By applying an appropriate bias to pin 3 of inverter IC10A via a resistor R144, a negative output can be obtained only in the first quarter of the left hand side of the screen. A variable resistor R143 is provided to permit variation in the midcentre point where the correction signal becomes negative. The red correction signal at pin 1 of IC10A is shown at 33 in FIG. 10, and the variable breakpoint whose position can be shifted by the setting of variable resistor R143 is shown at 34 in FIG. 10.

Figure 12:
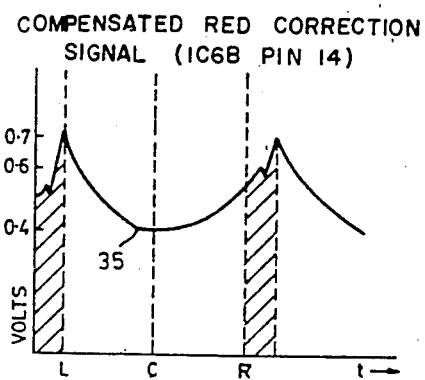

Red correction signal 33 is supplied to summing amplifier IC6B via a potentiometer R54, which can be adjusted to provide for the required degree of red correction for the particular dichroic mirrors employed in the video projector. Parabolic waveform 28 also is supplied via a resistor R55 to summing amplifier IC6B to compensate for loss in brightness at the edges of the screen. The output at pin 14 of summing amplifier IC6B is the waveform 35 shown in FIG. 12.

It should be noted that diode D22 is to prevent the bias voltage applied to pin 3 of IC10A from feeding back to IC10B, while diode D25 prevents this bias voltage from being supplied to summing amplifier IC6B.

The red, green and blue colour correction signals also optionally compensated to provide correction for loss of edge brightness are supplied to pins 9 of their respective multipliers 14, 37 and 38. Also supplied to pins 4 of these multipliers are red, green and blue drive (contrast) signals derived in a conventional manner. The output of each multiplier, which appears between pins 14 and 2 of the multiplier, is the product of the contrast signal and the correction signal for the particular colour. These outputs are supplied to differential amplifiers IC6A (red), IC6B (green) and IC5A (blue) that simply provide the proper voltage levels that are required by the next group of multipliers.

Figure 15:
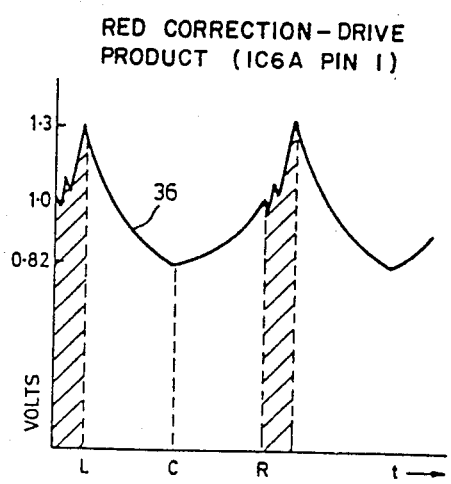
Figure 16:
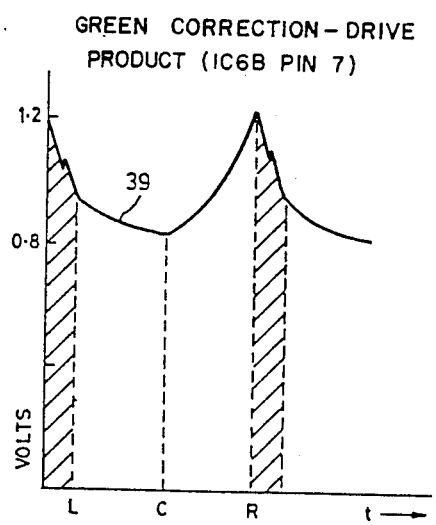

By way of example, the output waveform at pin 7 of differential amplifier IC6B is shown at 39 in FIG. 16. The output waveform at pin 1 of differential amplifier IC6A, which is similar to the output waveform at pin 7 of differential amplifier IC5A, is shown at 36 in FIG. 15.

Each multiplier 14, 37 and 38 is provided with an offset control. For the sake of simplicity only the offset control for red multiplier 14 will be discussed. The offset controls for the other two multipliers 37 and 38 are the same and serve the same purpose. The offset control for multiplier 14 is constituted by potentiometer R70 and compensates for the bias shift that occurs in the multiplier. To adjust potentiometer R70, the contrast signal on pin 4 should be set at its minimum and the output of differential amplifier IC6A should be monitored for no correction signal. If there is a correction signal present, potentiometer R70 should be adjusted until the output of differential amplifier IC6A is a flat DC voltage.

The subsequent processing of the signals in only the red video module now will be discussed, it being understood that the equivalent signals in the green and blue video modules will be similarly processed.

Figure 5:
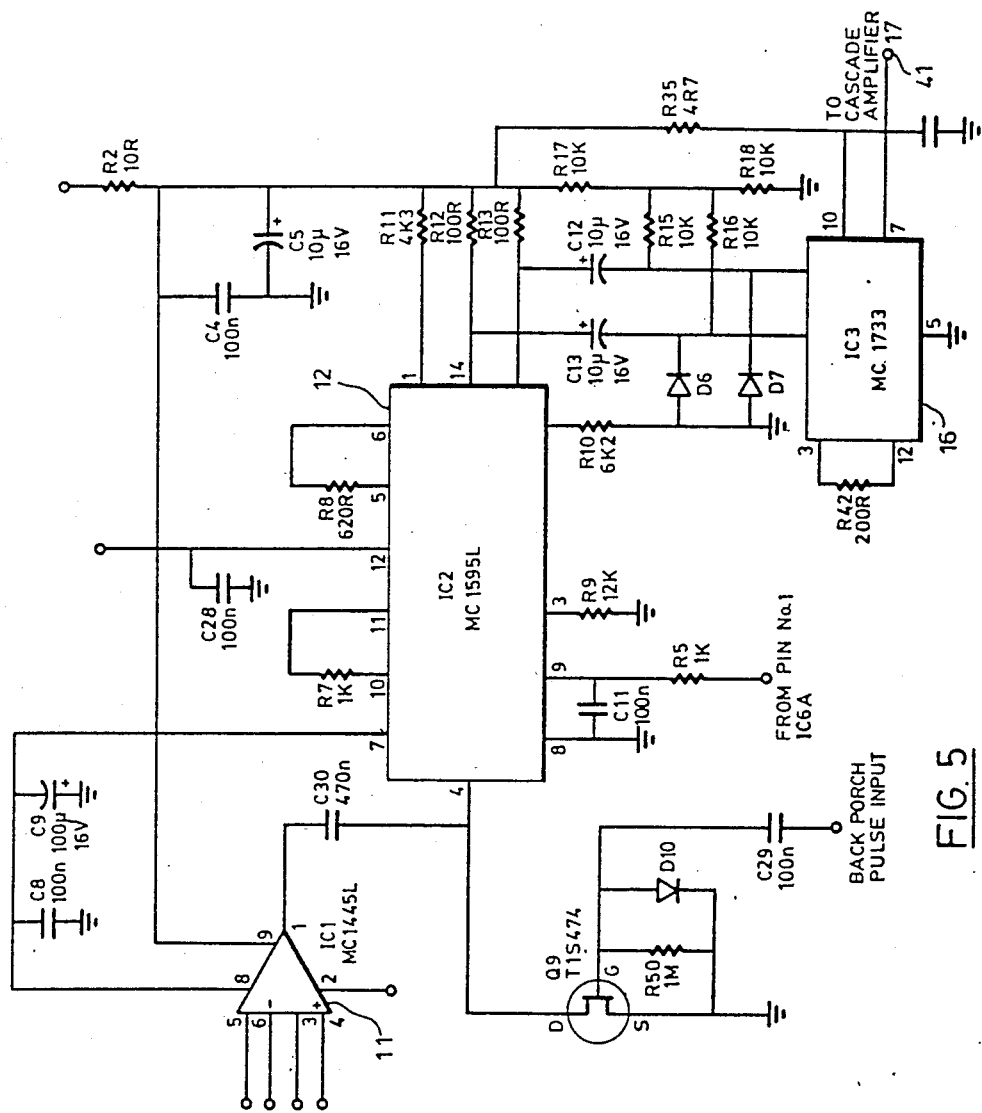
FIG. 5 is a circuit diagram of a portion of the red video module shown in FIG. 2, it being understood that similar systems to that shown in FIG. 5 are provided for each of the green and blue video modules.
Figure 17:
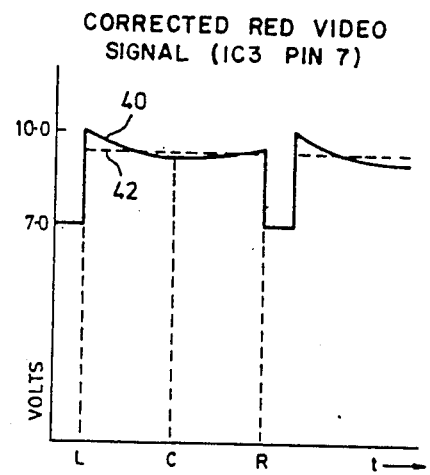

Thus, as shown in FIG. 2, and also in greater detail in FIG. 5, the red video signal from video amplifier 11 (IC1) is supplied to pin 4 of multiplier 12 (IC2) where it is multiplied with the output signal at pin 1 of differential amplifier IC6A to produce the waveform shown at 40 in FIG. 17, this waveform appearing at output terminal 41 in FIG. 5. Waveform 40 represents the desired product of the red video signal, the red drive (contrast) signal and the red correction signal. The red video signal without any correction applied to its shown in FIG. 17 by the dotted line 42.

Figure 18:
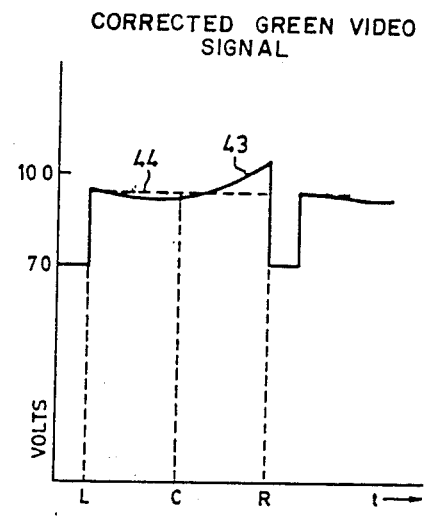

A similar waveform to that shown at 40 in FIG. 17 will be derived at pin 7 of blue differential amplifier IC3 (not shown), while the waveform 43 shown in FIG. 18 will be derived at pin 7 of green differential amplifier IC3 (not shown). In FIG. 18 dotted line 44 shows the green video signal without any correction applied to it.

Referring again to FIG. 5, it is necessary to clamp the bias on pin 4 of multiplier 12, to which the red video signal is supplied, to 0 Volts in order to prevent the background (gray video) from being distorted. If the background of pin 4 of multiplier 12 is of a different polarity than the high intensity data, which occurs when capacitive coupling is used, the background would be multiplied by the correction signal, which is not what is desired. To clamp the red video signal a FET Q9 is used as a switch. During the horizontal blanking period, when there is no red video signal, a back porch pulse of nominal 2 μs pulse width generated by the deflection circuitry of the video projector turns on FET Q9 grounding pin 4 of multiplier 12. When this occurs, capacitor C30 will charge such that when FET Q9 is turned off, pin 4 of multiplier 12 will remain at 0 volts until the red video signal beings. The same clamping system as hereinbefore described is used in the green and blue video modules (not shown).

It should be understood that the nature of multipliers 12 and 14 are such that the correction signal is directly proportional to the contrast level and the product of these two is directly proportional to the video signal.

While preferred embodiments of this invention have been described and illustrated herein, the person skilled in the art will appreciate that changes and modifications may be made therein without departing from the spirit and scope of this invention as defined in the appended claims.

The embodiments of the invention in which an exclusive property or privilege is claimed are defined as follows:

1. In combination with a colour video projector for projecting an image on a screen and of a type employing red, green and blue cathode ray tubes for projecting red, green and blue light respectively, dichroic mirrors and a final single lens through which the red, green and blue light is projected on said screen and which is characterized by non-uniform colour temperature across the width of the screen of the image projected thereon, the non-uniform colour temperature specifically being as a result of a substantially linear decrease in green light intensity between about the centerline of said screen and one edge thereof, said centerline being one-half way between said one edge of said screen and the edge thereof opposite to said one edge, a substantially linear decrease in blue light intensity between about said centerline of said screen and said opposite edge of said screen to said one edge thereof and a substantially linear increase in red light intensity between said opposite edge of said screen and a location part way between said opposite edge of said screen and said centerline of said screen, apparatus for improving the uniformity of said colour temperature across the width of said screen, said apparatus comprising: means for deriving red, green and blue contrast signals respectively; non-linear waveform generating means for deriving red, green and blue correction signals respectively, said red correction signal being of a type that will increase said red light intensity between said location and said opposite edge of said screen to compensate at least partially for the inherent decrease in said red light intensity between said location and said opposite edge of said screen, said green correction signal being of a type that will increase said green light intensity between about said centerline of said screen and said one edge of said screen to compensate at least partially for the inherent decrease in green light intensity between about said centerline of said screen and said one edge of said screen, and said blue correction signal being of a type that will increase said blue light intensity between about said centerline of said screen and said opposite edge thereof to compensate at least partially for the inherent decrease in blue light intensity between about said centerline of said screen and said opposite edge of said screen; multiplying means for multiplying said red contrast and said red correction signals, said green contrast and said green correction signals and said blue contrast and said blue correction signals to provide separate red, green and blue colour correction modulated red, green and blue contrast signals; means for deriving red, green and blue video signals; multiplying means for multiplying said red video signal and said red colour correction modulated red contrast signal, said green video signal and said green colour correction modulated green constrast signal and said blue video signal and said blue colour correction modulated blue contrast signal; and means for supplying the signals from the last-mentioned multiplying means to drive said red, green and blue cathode ray tubes respectively.

2. Apparatus according to claim 1 wherein said red, green and blue correction signals each are of substantially parabolic waveform.

3. Apparatus according to claim 1 wherein each of said red, green and blue correction signals also includes a component of parabolic waveform to increase the brightness of the projected image at and adjacent to said one and said opposite edges of said screen towards the brightness of the projected image at said centerline of said screen.

* * * * *

UNITED STATES PATENT AND TRADEMARK OFFICE
CERTIFICATE OF CORRECTION

PATENT NO. : 4,701,788

DATED : October 20, 1987

INVENTOR(S) : Francois G. Desjardins

It is certified that error appears in the above-identified patent and that said Letters Patent is hereby corrected as shown below:

In column 5, line 20: change "low" to --loss--.

In column 6, line 54, change "its" to --it is--.

In column 7, line 10, change "beings" to --begins--.

Signed and Sealed this

Fifth Day of April, 1988

Attest:

DONALD J. QUIGG

*Attesting Officer*  *Commissioner of Patents and Trademarks*